(12) United States Patent
Novack et al.

(10) Patent No.: US 7,546,454 B2
(45) Date of Patent: Jun. 9, 2009

(54) AUTOMATED DIGITAL CERTIFICATE DISCOVERY AND MANAGEMENT

(75) Inventors: Brian M. Novack, St. Louis, MO (US); Daniel Larry Madsen, Castro Valley, CA (US); Michael David Cheaney, Arnold, MO (US); Timothy R. Thompson, St. Louis, MO (US)

(73) Assignee: AT&T Intellectual Property I, L.P., Reno, NV (US)

( * ) Notice: Subject to any disclaimer, the term of this patent is extended or adjusted under 35 U.S.C. 154(b) by 748 days.

(21) Appl. No.: 10/879,217

(22) Filed: Jun. 30, 2004

(65) Prior Publication Data

US 2006/0015729 A1 Jan. 19, 2006

(51) Int. Cl.
*H04L 9/00* (2006.01)
(52) U.S. Cl. ..................................... 713/156
(58) Field of Classification Search ............... None
See application file for complete search history.

(56) References Cited

U.S. PATENT DOCUMENTS

| | | | |
|---|---|---|---|
| 5,548,646 A * | 8/1996 | Aziz et al. .................. 713/153 |
| 5,774,552 A | 6/1998 | Grimmer | |
| 6,324,645 B1 | 11/2001 | Andrews et al. | |
| 6,553,493 B1 | 4/2003 | Okumura et al. | |
| 6,564,320 B1 | 5/2003 | De Silva et al. | |
| 6,738,912 B2 | 5/2004 | Büttiker | |
| 2002/0004901 A1 | 1/2002 | Yip et al. | |
| 2002/0046335 A1 | 4/2002 | Baum-Waidner | |
| 2002/0162028 A1 | 10/2002 | Kennedy | |
| 2003/0065940 A1 | 4/2003 | Brezak et al. | |
| 2003/0093400 A1 * | 5/2003 | Santosuosso .................. 707/1 |
| 2003/0163686 A1 | 8/2003 | Ward et al. | |
| 2004/0093493 A1 | 5/2004 | Bisbee et al. | |
| 2004/0107366 A1 | 6/2004 | Balfanz et al. | |
| 2004/0193918 A1 * | 9/2004 | Green et al. ................. 713/201 |
| 2005/0071630 A1 * | 3/2005 | Thornton et al. ............ 713/156 |

OTHER PUBLICATIONS

"Linuxbroker", downloaded from http://howtos.linuxbroker.com/howtoreader.shtml?file=SSL-RedHat-HOWTO.html on May 30, 2004.

* cited by examiner

*Primary Examiner*—Brandon S Hoffman
(74) *Attorney, Agent, or Firm*—Greenblum & Bernstein, P.L.C.

(57) ABSTRACT

A scanner discovers digital certificates by scanning an address range. The scanner scans the address range to determine whether a digital certificate has been installed for each address in the address range. The scanner receives digital certificate information when the digital certificate has been installed for an address. The address range that is scanned may include addresses associated with an installed digital certificate and addresses not associated with an installed digital certificate.

27 Claims, 7 Drawing Sheets

FIGURE 3

| IP ADDRESS | PORT | NETWORK USER | ISSUER | EXPIRATION | SUBJECT | SERIAL NUMBER |
|---|---|---|---|---|---|---|
| | | | | | | |
| | | | | | | |
| | | | | | | |
| | | | | | | |

AUTOMATED DIGITAL CERTIFICATE DISCOVERY AND MANAGEMENT

BACKGROUND OF THE INVENTION

1. Field of the Invention

The present invention relates to computer networks. More particularly, the present invention relates to discovering, analyzing, cataloging, inventorying and monitoring digital certificate information for digital certificates installed on a network.

2. Background Information

A need exists to discover, analyze, catalog, inventory and monitor digital certificates installed on a network. In particular, if an administrator is not aware of the existence of a digital certificate on the network, the administrator is unable to avoid or resolve problems relating to the digital certificate. For example, network operations can be disrupted because a digital certificate on the network is issued by an untrustworthy certification authority. Additionally, network operations can be disrupted when no effort is made to renew an expiring digital certificate on the network. Furthermore, even if the administrator is aware of individual digital certificates installed on the network, the administrator does not have a tool to catalog, inventory, monitor and otherwise manage the digital certificates. As a result, untrustworthy or expiring digital certificates may cause significant disruption to network operations.

Currently, a digital certificate installed for an address on a network is issued by a certification authority. The digital certificate is provided to a client when the client contacts a server for an application that requires the exchange of sensitive information. For example, Secure Sockets Layer (SSL) communications involve a client contacting a server to access a particular application. The server provides the digital certificate to the client. The client may analyze the digital certificate information in real-time to determine whether the digital certificate is from a trusted certification authority. Additionally, the client may analyze a digital certificate in real-time to determine whether the digital certificate has expired. However, the SSL analysis occurs only in the context of attempting to authorize access to the application, and not to discover or manage the digital certificate.

Additionally, a user of a computer may install a digital certificate to ensure the security of communications such as emails. When the user generates a message, the user provides the digital certificate information with the message so that a recipient of the message can verify the source and contents of the message. However, the digital certificate analysis occurs only in the context of verifying the source and contents of the message.

Accordingly, digital certificates are provided to ensure the security and trustworthiness of information provided by an application or in a message from a user. However, an administrator does not have a tool to discover, analyze, catalog, inventory and monitor the digital certificates installed on a network for applications and users.

Accordingly, a need exists for a method and apparatus for scanning an address range in a computer network by contacting at least one destination to discover digital certificates so that the digital certificates can be analyzed, cataloged, inventoried and monitored. Additionally, a need exists for a method and apparatus for analyzing, cataloging, inventorying and monitoring digital certificates that are discovered.

To solve the above-described problems, a method and apparatus are provided for discovering, analyzing, cataloging, inventorying and monitoring digital certificates.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawing, and in which:

FIG. 3 is an exemplary inventory of discovered digital certificates, according to an aspect of the present invention;

DETAILED DESCRIPTION

Figure 1:
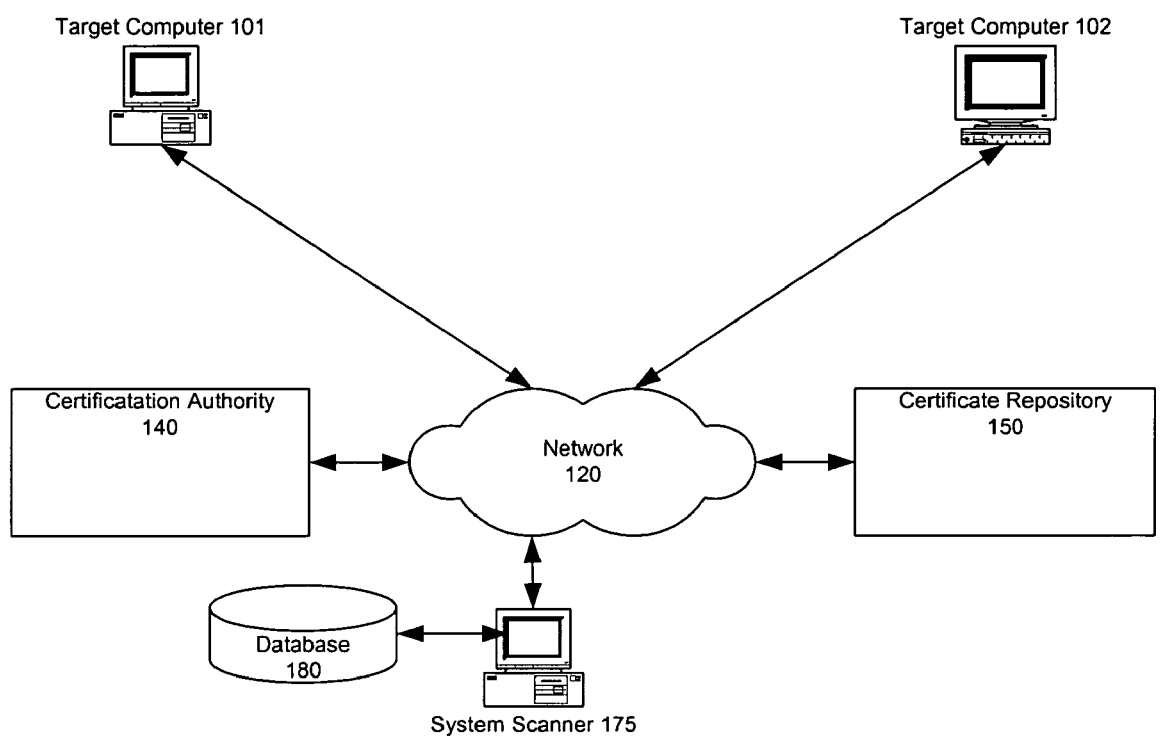
FIG. 1 shows an exemplary computer network for automatically discovering and managing digital certificates, according to an aspect of the present invention.

In view of the foregoing, the present invention, through one or more of its various aspects, embodiments and/or specific features or sub-components, is thus intended to bring out one or more of the advantages as specifically noted below.

According to an aspect of the present invention, a scanner discovers digital certificates by scanning an address range. The scanner scans the address range to determine whether a digital certificate has been installed for each address in the address range. The scanner receives digital certificate information when the digital certificate has been installed for any address in the address range.

According to another aspect of the present invention, the address range includes an address associated with the installed digital certificate and an address not associated with any installed digital certificate.

According to still another aspect of the present invention, the scanner includes an analyzing module that analyzes the digital certificate information. The scanner also includes a cataloging module that catalogs the analyzed digital certificate information, an inventorying module that inventories the analyzed digital certificate information, and/or a monitoring module that monitors the analyzed digital certificate information.

According to yet another aspect of the present invention, the scanner includes an analyzing module that analyzes the digital certificate information for multiple digital certificates installed for corresponding ports at a single IP address. In this regard, each address of the address range may include a port number and an IP address.

According to another aspect of the present invention, the scanner scans the address range by attempting to forward a query to a device at each address in the address range to determine whether the digital certificate has been installed for the address.

According to still another aspect of the present invention, the scanner scans the address range by forwarding a query to a repository to determine whether the digital certificate has been installed for each address in the address range.

According to an aspect of the present invention, a method is provided for discovering digital certificates. The method includes scanning an address range to determine whether a digital certificate has been installed for each address in the address range. The method also includes receiving information of the digital certificate when the digital certificate has been installed for any address in the address range.

According to another aspect of the present invention, the address range includes an address associated with the installed digital certificate and an address not associated with any installed digital certificate.

According to still another aspect of the present invention, the digital certificate information is analyzed. Furthermore, the analyzed digital certificate information is cataloged, inventoried and/or monitored.

According to yet another aspect of the present invention, the analyzing includes an analysis for multiple digital certificates installed for corresponding ports at a single IP address. In this regard, each address of the address range includes a port number and an IP address.

According to another aspect of the present invention, the scanning includes attempting to forward a query to a device at each address in the address range to determine whether the digital certificate has been installed for the address.

According to still another aspect of the present invention, the scanning includes forwarding a query to a repository to determine whether the digital certificate has been installed for each address in the address range.

According to an aspect of the present invention, a computer readable medium stores a program that discovers digital certificates by scanning an address range. The computer readable medium includes an address scanning code segment that scans an address range to determine whether a digital certificate has been installed for each address in the address range. The computer readable medium also includes an information receiving code segment that receives information of the digital certificate when the digital certificate has been installed for any address in the address range.

According to another aspect of the present invention, the address range includes an address associated with the installed digital certificate and an address not associated with any installed digital certificate.

According to still another aspect of the present invention, the computer readable medium also includes an analyzing code segment that analyzes the received digital certificate information. The computer readable medium also includes a cataloging code segment that catalogs analyzed digital certificate information, an inventorying code segment that inventories analyzed digital certificate information and/or a monitoring code segment that monitors analyzed digital certificate information.

According to yet another aspect of the present invention, the information receiving code segment analyzes digital certificate information for multiple digital certificates installed for corresponding ports at a single IP address. In this regard, each address of the address range may include a port number and an EP address.

According to another aspect of the present invention, the scanning includes attempting to forward a query to a device at each address in the address range to determine whether the digital certificate has been installed for the address.

According to still another aspect of the present invention, the scanning includes forwarding a query to a repository to determine whether the digital certificate has been installed for each address in the address range.

According to an aspect of the present invention, a scanner manages discovered digital certificates. The scanner receives digital certificate information when a digital certificate is determined to be available for an address. The scanner also analyzes the received digital certificate information and catalogs, inventories and/or monitors the analyzed digital certificate information.

According to another aspect of the present invention, the cataloging includes categorizing the digital certificate information into a category according to a predetermined parameter.

According to still another aspect of the present invention, the inventorying includes obtaining statistics relating to a group of discovered digital certificates.

According to yet another aspect of the present invention, the monitoring includes periodically re-forwarding the query to a destination and determining whether the digital certificate is still available for the address.

According to another aspect of the present invention, the monitoring includes periodically re-analyzing the received digital certificate information.

According to an aspect of the present invention, a method is provided for managing discovered digital certificates. The method includes receiving digital certificate information when a digital certificate is determined to be available for an address. The method also includes analyzing the received digital certificate information. The method further includes cataloging, inventorying and/or monitoring the analyzed digital certificate information.

According to another aspect of the present invention, the cataloging includes categorizing the digital certificate information into a category according to a predetermined parameter.

According to still another aspect of the present invention, the inventorying includes obtaining statistics relating to a group of discovered digital certificates.

According to yet another aspect of the present invention, the monitoring includes periodically re-forwarding the query to the destination and determining whether the digital certificate is still available for the address.

According to another aspect of the present invention, the monitoring includes periodically re-analyzing the received digital certificate information.

According to an aspect of the present invention, a computer readable medium is provided that manages discovered digital certificates. The computer readable medium includes a digital certificate receiving code segment that receives digital certificate information when a digital certificate is determined to be available for an address. The computer readable medium also includes an analyzing code segment that analyzes the received digital certificate information. The computer readable medium further includes a cataloging code segment that catalogs analyzed digital certificate information, an inventorying code segment that inventories digital certificate information, and/or a monitoring code segment that monitors digital certificate information.

According to another aspect of the present invention, the cataloging includes categorizing the digital certificate information into a category according to a predetermined parameter.

According to still another aspect of the present invention, the inventorying includes obtaining statistics relating to a group of discovered digital certificates.

According to yet another aspect of the present invention, the monitoring includes periodically re-forwarding the query to the destination and determining whether the digital certificate is still available for the address.

According to another aspect of the present invention, the monitoring includes periodically re-analyzing the received digital certificate information.

Multiple computers communicate over a network. A computer may be any device having a processor and a communications interface for communicating electronically with other devices over the network. The network may be of any type that enables communication between the computers, including a local area network (LAN) and/or a wide area network (WAN).

A digital certificate issued by a certification authority (CA) is installed for a computer. The digital certificate is part of a public key infrastructure (PKI) that uses cryptography and digital signatures to ensure the security and authenticity of communications between computers in the network. An exemplary digital certificate complies with ITU-T Recommendation X.509.

Public key infrastructure uses key pairs of a private key and a public key. The digital certificate asserts that a certain public key is bound to a "subject" of the certificate, i.e., the entity to which the certificate is issued. The public key is made widely available by the subject of the certificate. The private key is held securely by the subject of the certificate. The public key and private key are mathematically related so that a message encrypted using the private key may be decrypted using the public key.

A "digital signature" can be provided to a message recipient using the private key. The digital signature is generated by encrypting a version of the message. The digital signature allows the recipient to (i) authenticate the message by verifying that the message was encrypted using the private key of the message sender; and (ii) bind the message sender to the message such that the signer cannot later deny that the message was signed with the message sender's private key. In other words, using the public key received from the message sender, the recipient can verify the contents and origin of a message.

To generate a digital signature using a key pair, a hash function may be used to create a one-way hash (i.e., a message digest) of the message. The message digest is then encrypted using the private key to produce the digital signature for the message. The message recipient uses the public key to decrypt the message digest. The recipient also generates a one-way hash of the received message, using the same hash function used by the message sender. The decrypted one-way hash and the newly generated one-way hash are compared to verify the digital signature and thereby authenticate the message. The decrypted one-way hash and the newly generated one-way hash should be identical.

If a recipient wishes to validate the assertion that a public key is bound to the entity, the recipient may verify the certification authority's digital signature in the same manner a recipient would verify the signature of the sender of a message as noted above. In other words, the recipient can decrypt the certification authority's digital signature using the certification authority's public key to obtain a digest of the digital certificate information. Additionally, the recipient can generate a one-way hash of the digital signature information using the same hash function used by the certification authority.

A digital certificate may be stored on any type of computer readable media, including hard drives, smart cards, flash memory, floppy memory and floppy drives.

FIG. 1 shows an exemplary computer network for automatically discovering and managing digital certificates. As shown, multiple target computers 101, 102 are connected through a network 120. The target computers 101, 102 may be computers of a corporate or governmental entity that provides such computers to employees. A target computer 101 or 102 may be a personal digital assistant (PDA), a personal computer (PC), a handheld computer, a desktop computer, a laptop computer, a notebook computer, a mini computer, a workstation, a mainframe computer, or any other type of device that includes a processor and a communications interface for communicating over the network 120.

The network 120 may be a network or combination of networks, including wireline networks, wireless networks, or a combination of wireline and wireless networks. As an example, the network 120 may also be a local area network (LAN), or a combination of bridged local area networks that form a wide area network (WAN).

A system scanner 175 is also connected to the network 120. Similar to the target computers 101, 102, the system scanner 175 includes a processor and a communications interface to communicate over the network 120. The scanner 175 discovers digital certificates by scanning an address range. The address includes characters identifying a destination of a message sent through a communications system. Accordingly, an address in an address range may be an internet protocol (IP) address, a signaling system 7 (SS7) point code, an address for a local addressing system such as an EBM Token Ring, or any other address that represents an intermediate or terminal node on a network. The network address is typically a unique identifier assigned for each intermediate or terminating network connection. The identifier may be randomly assigned by the provider or created in response to a request for a specific identifier from the process establishing the connection (e.g., variable and temporary addresses). The format of the network address may be provider-specific.

In an embodiment, the scanner 175 scans an address by attempting to forward a query to a target computer 101 or 102 at the address to determine whether a digital certificate has been installed for the address. In this regard, the scanning of the present invention does not require advance knowledge or expectation that a target computer 101 or 102 is provided at the address or that a digital certificate is installed for the address. The scanner obtains an address range of addresses on the network, and attempts to determine whether the target computers 101, 102 are connected to the network at an address in the address range. Furthermore, the scanner does not wait to be contacted by a device at an address before attempting to determine if a digital certificate is installed for the address. Rather, the scanning occurs without knowing whether a device is connected at an address, or whether a digital certificate is installed for any device connected to the address. In this regard, scanning a range of addresses can include determining whether a device is connected to a network at each address by attempting to contact a device at each address in the range. Additionally, scanning includes determining whether a digital certificate is installed for an address when a device is connected to the address.

An address range may be scanned in a single session or during multiple different communication sessions. The address range may include only one address or more than one address. The address range may include the addresses of one or both of the target computers 101, 102.

The scanner 175 attempts to contact a target computer 101, 102 at each address in the range and, if no target computer 101, 102 is present at the address, the scanner 175 determines that no digital certificate has been installed for the address. If a target computer 101, 102 is present at the address, the scanner 175 determines whether a digital certificate has been installed for the address. When the scanner 175 is provided with an address range, the scanner may serially scan each address to determine whether a target computer 101, 102 is present at the address and whether a digital certificate has been installed for any address with a target computer 101, 102.

The addresses scanned by the scanner 175 may include a port of a target computer 101, 102. For example, the scanner 175 may attempt to contact port 443 (which corresponds to HTTPS) of a target computer 101, 102 to determine whether port 443 is associated with a digital certificate. Further, the scanner 175 may scan multiple ports on a target computer 101, 102 at a single address. For example, the scanner 175 may scan ports 443 (HTTPS) and 80 (HTTP) to determine whether digital certificates have separately been installed for the different ports.

In an embodiment, the system scanner 175 uses a communications protocol, e.g., the Secure Sockets Layer (SSL) protocol, for secure and trustworthy communications. A Secure Sockets Layer session begins with an exchange of messages known as a handshake. In the embodiment of FIG. 1, the handshake occurs between the system scanner 175 and a target computer 101, 102. The handshake includes the system scanner 175 contacting the target computer 101, 102. In response to the system scanner 175 contacting either of the target computers 101, 102, the target computer 101 or 102 sends the system scanner 175 a digital certificate.

The users of the target computers 101, 102 may install digital certificates from a certification authority 140. The certification authority 140 issues digital certificates to subscribers or clients. The certification authority 140 generates information for a digital certificate and signs the digital certificate information by encrypting the information with the certification authority's 140 private key. The digital certificate is transmitted to the target computer 101 or 102 upon the request and verification of, e.g., the user of the target computer 101 or 102 or the entity providing an automated application at the target computer 101 or 102.

According to an aspect of the present invention, the system scanner 175 can be used to periodically scan network addresses. For example, the network may be assigned a range of internet protocol (IP) addresses which an administrator scans periodically to determine whether digital certificates have been installed for the target computers 101, 102. The internet protocol addresses may correspond to an individual target computer 101, 102 or another device that can communicate over the internet. The scanner 175 determines when no target computer 101, 102 is present at an address or when no digital certificate has been installed for a target computer 101, 102 at the address. When the scanner 175 determines that a digital certificate has been installed for a target computer 101, 102 at an address, the scanner obtains the digital certificate's information from the target computer 101, 102. Accordingly, the scanner 175 is used to efficiently track the various digital certificates that are installed on the network 120.

A certificate repository 150 is also connected to the network 120. The certificate repository 150 is used as a databank of digital certificate information. In an embodiment, the certification repository 150 is provided with the digital certificate information when a digital certificate is issued by the certification authority 140. Additionally, a digital certificate may be issued by a certification authority 140 with instructions to contact the certificate repository 150 in order to verify the authenticity of the digital certificate. The instructions may be included as data that accompanies the digital certificate. Accordingly, the certificate repository 150 stores digital certificate information for multiple digital certificates in a memory such as a database.

In an embodiment, the system scanner 175 contacts the certificate repository 150 and discovers digital certificates by scanning the certificate repository 150 for information regarding digital certificates associated with an address range. The certificate repository 150 may include a database that stores digital certificates by address, subject or any other criteria. The digital certificates can be retrieved when a requester requests digital certificates that match a specified parameter such as IP address or a range of addresses. Such a database scan can be in lieu of physically scanning the individual addresses of the address range on the network. While a certificate repository 150 is not expected to store digital certificate information for every digital certificate from every certification authority 140 that exists, the system scanner 175 may efficiently use the certificate repository 150 to determine when a digital certificate from a contributing certification authority 140 has been installed for a particular address in an address range.

Accordingly, the system scanner 175 can scan an address range by attempting to forward a query directly to destinations such as a target computer 101 or 102 at an address. Alternatively, the system scanner 175 can scan an address range by attempting to forward a query to a destination such as a certificate repository 150. When the system scanner 175 attempts to forward a query to the certificate repository 150, the query includes information of at least one address in an address range that the system scanner 175 is scanning for digital certificates.

If a digital certificate is installed for an address, the digital certificate information is returned to the system scanner 175. In the embodiment of FIG. 1, the system scanner 175 catalogs and inventories the information in a database 180 or any other suitable form of memory. The information that is returned and inventoried may include the subject (user or other entity) identification, the public key value for the certificate, the certification authority 140 name, the validity period for the digital certificate, and other similar information associated with the digital certificate.

The information received by the system scanner 175 may also include extension information that is not specifically called for in a protocol for the digital certificate. In this regard, a certification authority 140 may add information to a digital certificate that is not required by, but which is not inconsistent with, a protocol for the digital certificate.

The system scanner 175 catalogs and inventories the digital certificate information that is discovered in the database 180. The digital certificate information can be cataloged, inventoried and analyzed so that the digital certificates can be managed as an asset. For example, an administrator can classify digital certificates into groups by certification authority or expiration date.

In an embodiment, the digital certificates can be managed to help support service level agreements by ensuring no more than a specified number of digital certificates from a particular certification authority 140 have been installed for addresses on an internal or local network. Additionally, the digital certificates can be managed to assure compliance with licensing requirements by ensuring that software and/or hardware on the network is not being misused. Furthermore, the digital certificates can be managed to ensure that duplicate key-pairs are not installed without the knowledge or permission of the digital certificate subject or the issuing certification authority.

The inventoried digital certificate information can be analyzed, e.g., to determine if digital certificates from an unauthorized certification authority are being improperly used. In this regard, if a particular certification authority is not trusted, an administrator can inform the user to cancel the certification authority's 140 digital certificate and obtain a digital certificate from another certification authority 140. The administrator may have a list of trusted certification authorities 140 that are trusted to provide digital certificates on the network 120.

Alternatively, the administrator may wish to notify users to obtain new digital certificates a predetermined time before the digital certificate expires. For example, if digital certificates are cataloged together by expiration date, arrangements can be made to replace the particular category of digital certificates that expire in a particular period, e.g., June 2004. Accordingly, using the system scanner 175 and the database 180, the administrator can analyze and manage the digital certificates installed for an address in an address range on the network 120.

An administrator can monitor the digital certificate information inventoried in the database 180. For example, the administrator can periodically search the digital certificate information to determine if any digital certificate is set to expire. Additionally, when the administrator determines that a particular certification authority cannot be trusted, the administrator can search the database 180 to determine whether any digital certificates from the untrusted certification authority have been installed on the target computers 101, 102. Accordingly, using the system scanner 175 and the database 180, the administrator can monitor the inventoried digital certification information from time to time.

The analysis of digital certificate information may also be performed live, regardless of whether the digital certificate information is to be cataloged and inventoried in the database 180. In this regard, an administrator may scan through multiple addresses to discover a particular digital certificate that has been improperly installed on a target computer 101, 102 or to discover any digital certificate that fits a predetermined criteria. For example, an administrator may search for a digital certificate assigned to a particular subject when a complaint is received that the digital certificate has been "self-signed" by the subject. Alternatively, when a particular certification authority has been exposed as fraudulent, an administrator may wish to prevent use of the fraudulent certification authority's digital certificates by banning the associated IP address from using the network until the offending digital certificates are cancelled.

Accordingly, the system scanner 175 can be used to discover, analyze, categorize, inventory and monitor the digital certificates stored on a network for a particular set of addresses or for addresses in an address range. The analysis and management may occur live or after the digital certificate information is cataloged and inventoried in a predetermined and searchable format. Further, the discovery may occur in a single communications session or over a period of time that includes numerous communications sessions.

Figure 2:
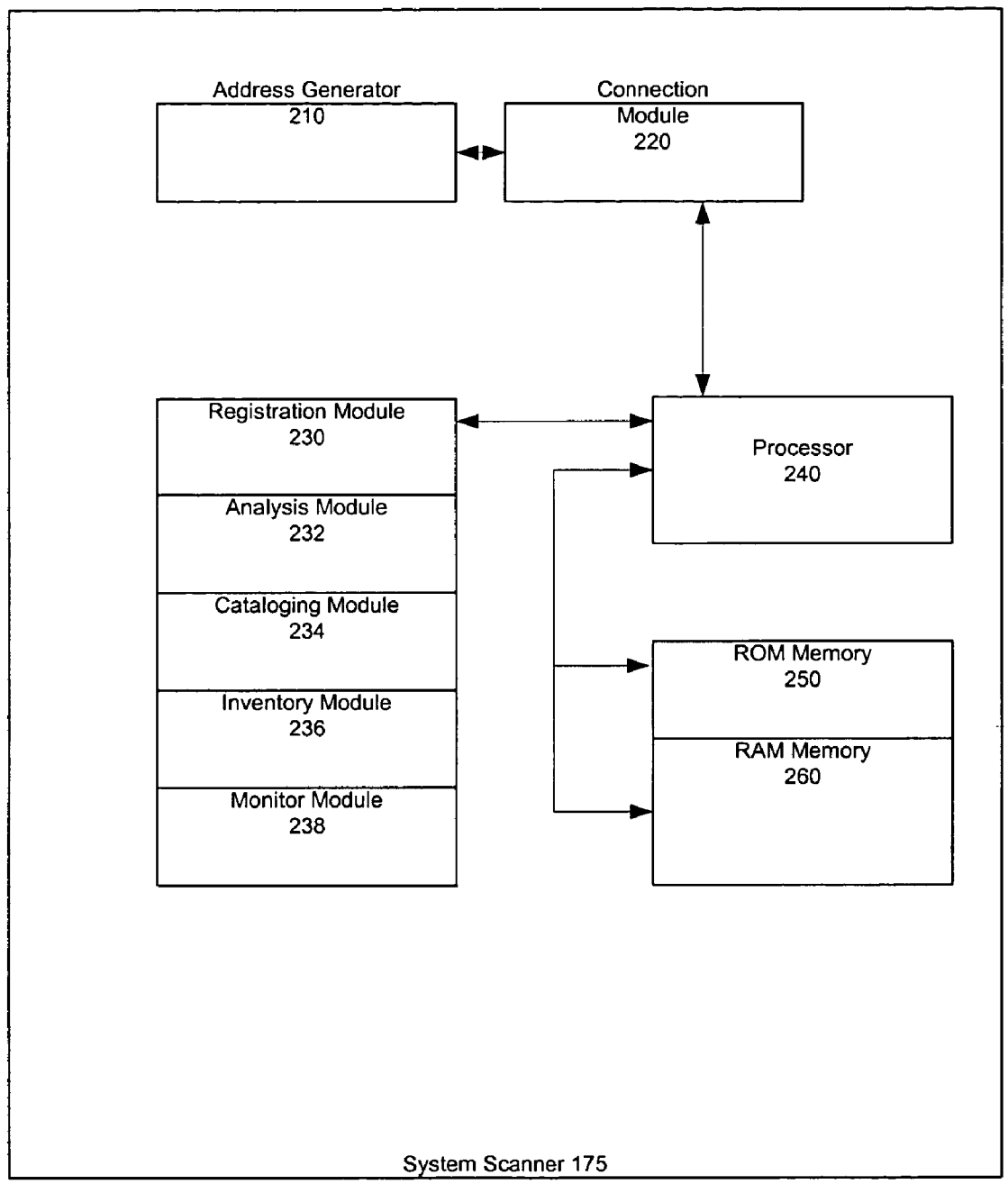
FIG. 2 is an exemplary system scanner for automatically discovering and managing digital certificates, according to an aspect of the present invention.

FIG. 2 shows the architecture of an exemplary system scanner 175 for automatically discovering and managing digital certificates. As shown, the system scanner 175 includes a processor 240, read only memory (ROM) 250 and random access memory (RAM) 260. The read only memory 250 may store fixed operating procedures, e.g., operating system instructions, for the system scanner 175, including instructions for routines and subroutines unrelated to scanning. The random access memory 260 may store data as directed by the user of the system scanner 175. The system scanner 175 also includes a connection module 220 that stores the procedures and information for establishing (or attempting to establish), maintaining and using a connection. The connection module 220 may establish and maintain a secure sockets layer (SSL) connection. For example, the connection module 220 stores a routine for attempting a handshake with a target computer 101, 102 at a given address. Additionally, the connection module 220 may perform a standard SSL analysis to ensure that a discovered digital certificate is not already expired or otherwise invalid.

An address generator 210 provides addresses for the connection module 220 to attempt to contact target computers 101, 102. The address generator 210 may receive addresses, including a list of addresses or an address range, from a user of the system scanner 175. Additionally, the address generator 210 may record network addresses where digital certificates have previously been discovered.

The system scanner 175 includes a registration module 230 for registering and organizing information that is received from the target computers 101, 102. For example, the registration module may organize the digital certificate information received for each discovered digital certificate into a predetermined format. An exemplary predetermined format for information organized by the registration module 230 is shown in FIG. 3.

The system scanner 175 also includes an analysis module 232. As is shown in FIG. 2, the analysis module 232 is provided separately from the connection module 220. In particular, the analysis module 232 performs an analysis for managing a digital certificate discovered by the system scanner 175. The analysis performed by the analysis module 232 is performed according to criteria set by a user of the system scanner 175 or determined by a provider of the system scanner 175. Accordingly, the analysis module 232 performs an analysis to search predetermined parameters of digital certificate information for specified information, such as "self-signed" digital certificates where the subject is the same entity as the certification authority. The analysis by the analysis module 232 may be performed to manage the digital certificates that are discovered in real-time or at a time after discovery. The analysis by the analysis module 232 may be used to ensure that invalid, expired or untrustworthy digital certificates are removed from the network. Additionally, the analysis by the analysis module 232 may be used to ensure that users who install invalid, expired or untrustworthy digital certificates are prevented from using network resources until the digital certificates are removed or replaced.

As an example, the analysis module 232 may perform a search for digital certificates that expire in a given time period in the future. Additionally, the analysis module 232 may search for digital certificates from a specified certification authority 140. The analysis module 232 may also search for digital certificates that are self-signed by a subject of the digital certificate, e.g., when the subject of the digital certificate is also the certification authority that verifies the authenticity of the digital certificate. In an embodiment, the analysis module 232 may parse digital certificate information for any data provided by X.509 protocol-compliant digital certificates. Additionally, the analysis module 232 may parse and find any extension data provided to supplement or otherwise modify X.509 protocol-compliant digital certificates.

The system scanner 175 also includes a cataloging module 234 that catalogs digital certificate information by, e.g., organizing information of one or more digital certificates into data groups. For example, the cataloging module 234 may categorize digital certificate information by expiration month and/or the issuing certification authority. Further, the cataloging module 234 may categorize digital certificate information into groups by trustworthiness. For example, information from digital certificates signed by completely trustworthy certification authorities may be placed in a category that is subject only to infrequent periodic reviews of expiration dates. Information from less-well established certification authorities may be placed in a category that is subject to frequent review to ensure the digital certificates are not being abused or misused. Accordingly, the cataloging module 234 can organize digital certificates according to any criteria set by a user or provider of the system scanner 175.

The system scanner 175 also includes an inventory module 236. In addition to submitting the digital certificate information for assignment to random access memory 260 or the database 180, the inventory module 236 compiles and stores summary information of the digital certificates discovered by the system scanner 175. For example, the inventory module 236 may include a counter that counts the number of digital certificates that are provided to a group of target computers 101, 102 by a specified certification authority. In this regard, a corporate or governmental entity may have a contract with a certification authority to obtain a specified number of digital certificates for the target computers 101, 102 used by users or members of the corporate or governmental entity. The inventory module 236 may be used to ensure that users do not install more than the specified number of digital certificates from the contracting certification authority. Of course, the inventory module 236 may inventory the discovered digital certificates according to any criteria set by a user or provider of the system scanner 175.

The system scanner 175 also includes a monitor module 238. The monitor module 238 may perform a predetermined periodic review of the discovered digital certificates. For example, the monitor module 238 may search for any digital certificates that expire within 30 days of the search. In this regard, the monitor module 238 may perform the periodic search at any interval of time specified by the user or provider of the system scanner 175.

Of course, the system scanner 175 may also be used to contact the certificate repository 150 to scan an address range and determine whether a digital certificate has been installed for an address in the address range. In particular, the connection module 220 may be used to contact the certificate repository 150 and establish a secure communication with the certificate repository 150. When the communication is established, the address generator 210 is used to provide an address range of one or more addresses to be used in a query to the certificate repository 150. If a digital certificate is installed for an address in the address range, the digital certificate information is retrieved and processed by the registration module 230, the analysis module 232, the cataloging module 234, the inventory module 236 and the monitory module 238. Additionally, although not shown, a structured query language (SQL) module may be used to format a structured query that can be used to search the certificate repository for digital certificates installed for addresses in an address range.

Accordingly, the exemplary system scanner 175 includes modules that are used to discover digital certificates by scanning an address range to determine whether a digital certificate has been installed for the address. Additionally, the exemplary scanner 175 includes modules that are used to analyze, catalog, inventory and monitor the information of any discovered digital certificates.

FIG. 3 shows an exemplary format for inventorying discovered digital certificates. As shown, the first three columns store information that identifies the address, port and user corresponding to a discovered digital certificate. When the system scanner 175 attempts to contact target computers 101, 102 directly at addresses in an address range, the system scanner 175 will initially possess the IP address and port used to establish a communications connection with target computer 101, 102. When the system scanner 175 searches the certificate repository 150, the same type of information will be obtained as when the system scanner 175 attempts to contact target computers 101, 102 directly. In an embodiment, information will only be entered into a row when a digital certificate is discovered. Accordingly, information for addresses which are unavailable, or for addresses which correspond to a target computer 101, 102 that has no digital certificate installed, will not appear in the table. Alternatively, an entry may be provided for every address in an address range, even when no digital certificate is installed for an address.

The column for the network user will include known information for the user assigned to the corresponding address and port. If the IP address and port are not assigned to a known user, the entry may be blank or marked "Unavailable". Additionally, a certificate repository 150 may not store information of the network user separate from the subject of a digital certificate. Accordingly, if the certificate repository 150 does not store information of a known network user, the entry may be blank or marked "Unavailable".

The fourth column indicates the issuer of the digital certificate. The issuer is the certification authority that issues the digital certificate. The fifth column indicates the expiration date on which the digital certificate expires. Although not shown, a validity period may be provided in a field, so that the first validity date is also indicated.

The sixth column indicates the subject of the digital certificate. Because a certification authority is certifying the identity of the subject of the digital certificate, the subject's identity should be verified by the certification authority. Furthermore, if the subject is an individual, the subject field should include information similar to the network user field. When the subject field is an organizational entity, the network user should be affiliated with the organization. The seventh column includes the serial number, according to the issuer's numbering system.

Accordingly, the exemplary format for inventorying discovered digital certificate information in FIG. 3 can be used to provide information that is used to analyze, catalog and monitor digital certificates. Additionally, although not shown, the format for inventorying discovered digital certificate information can include information placed in a different order, or information provided as an extension to a digital certificate protocol, such as the X.509 protocol. In this regard, the format for inventorying discovered digital certificate information may be varied to include a different order, to exclude information shown in FIG. 3, or to include additional information for digital certificates of any protocol or extension of protocol.

Figure 4:
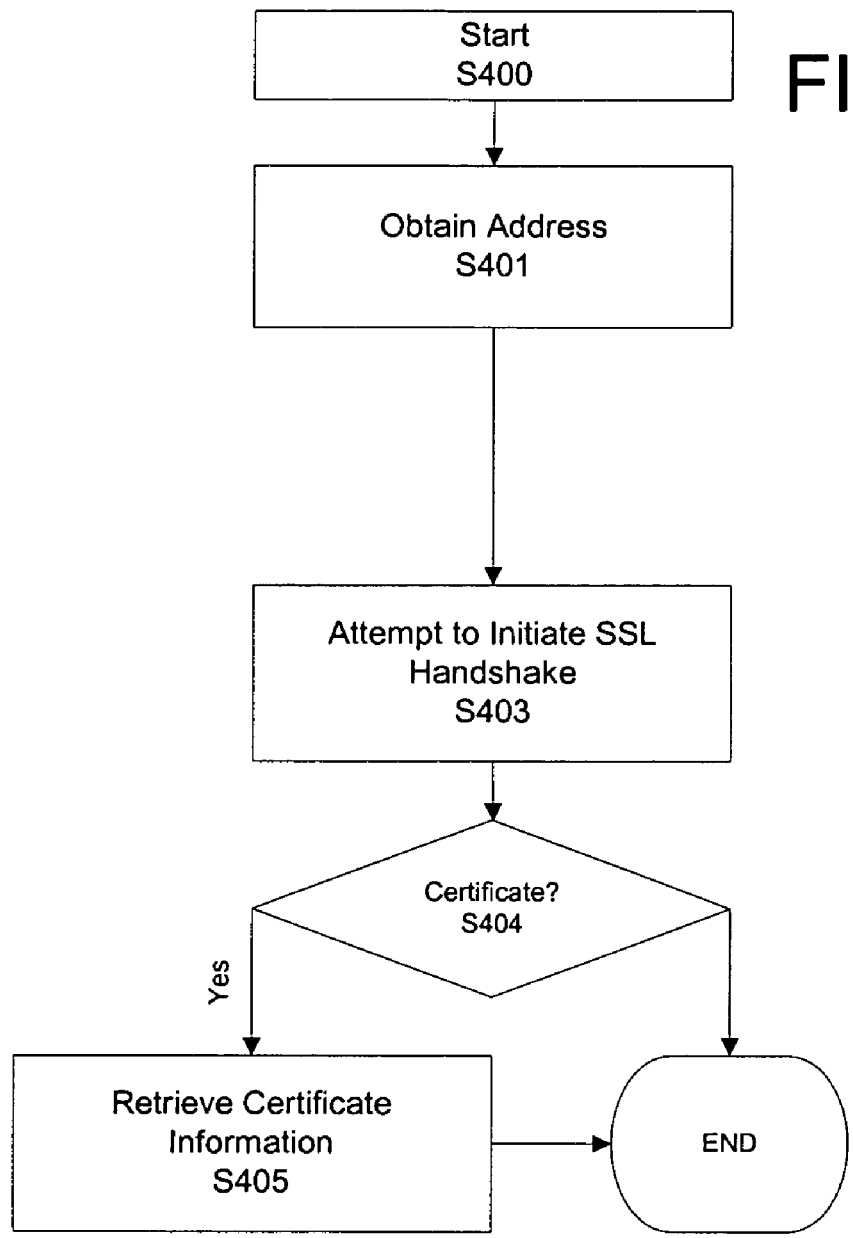
FIG. 4 is an exemplary flow diagram showing a method for automatically discovering digital certificates, according to an aspect of the present invention.

FIG. 4 is a flow diagram showing a method for automatically discovering digital certificates. The process starts at S400. At S401 the system scanner 175 obtains an address from the address generator 210. Using the address, the system scanner 175 attempts to initiate an SSL handshake at S403 by forming a query and attempting to forward the query to a destination target computer 101, 102 at S403. If a target computer 101, 102 is connected to the network 120 at the address, (i.e., if the query reaches a proper destination), a determination is made at S404 whether a digital certificate is installed for the address.

If a digital certificate is installed for the address (S404=Yes), the digital certificate information is retrieved at S405. The process ends after S405 or if no digital certificate is installed for the address (S404=No).

Figure 5:
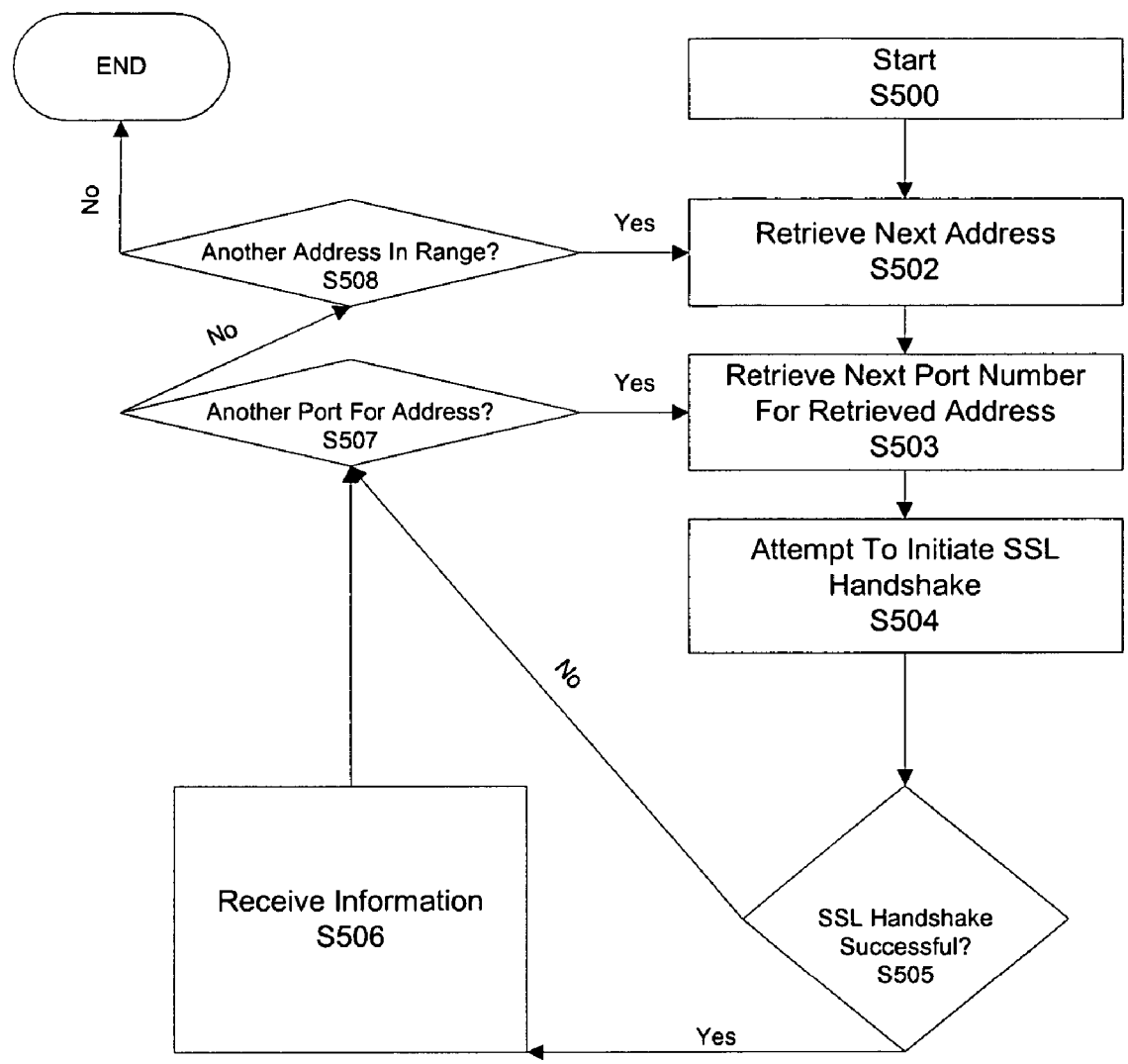
FIG. 5 is another exemplary flow diagram for automatically discovering digital certificates, according to an aspect of the present invention.

FIG. 5 shows a flow diagram for scanning an address range for digital certificates. The process starts at S500. At S502, an address is retrieved from the address generator 210 and at S503 a port number is retrieved for the address from the address generator 210. At S504, the system scanner 175 attempts to initiate an SSL handshake by forming a query and attempting to forward the query to a destination target computer 101, 102. At S505, a determination is made whether the SSL handshake was successful. If the handshake was successful (S505=Yes), the certificate information is received at S506. After the certificate information is received at S506, or if the SSL handshake is not successful (S505=No), a determination is made whether another port exists for the address at S507.

If another port exists for the address (S507=Yes), the process returns to S503 to retrieve the port number and the process repeats. If another port does not exist for the address (S507=No), a determination is made at S508 whether another address exists in the address range being scanned. If another address exists in the address range (S508=Yes), the next address is retrieved at S502, and the entire process is repeated to retrieve information for digital certificates installed for any port at the new address. If another address does not exist in the address range (S508=No), the process ends at S509.

Figure 6:
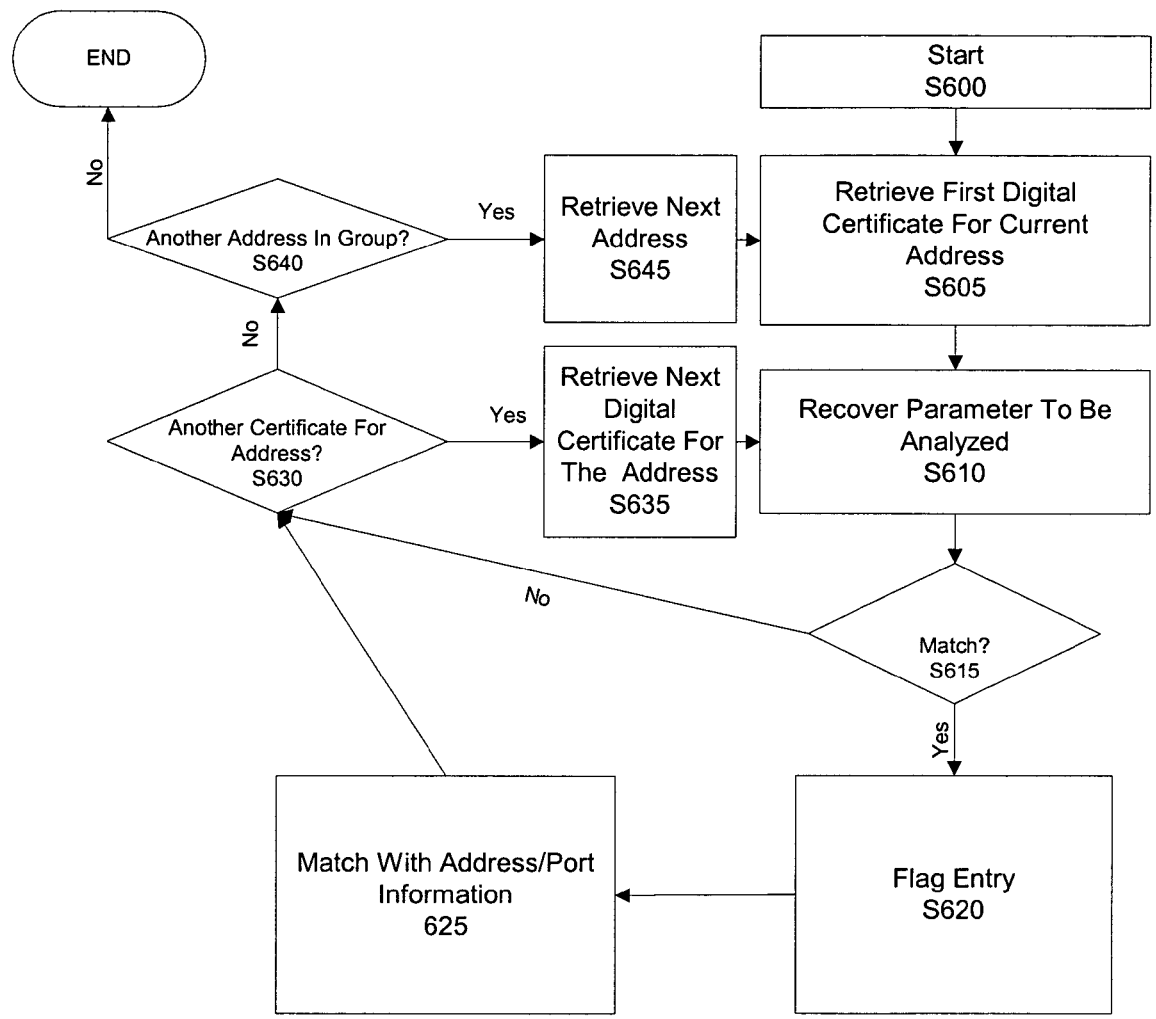
FIG. 6 is an exemplary flow diagram for analyzing digital certificates, according to an aspect of the present invention.

FIG. 6 is a flow diagram for analyzing digital certificates. The process starts at S600, and at S605 information of a first digital certificate for the current (first) address is retrieved. At S610, a particular parameter of the information that is sought for analysis is recovered. In the embodiment of FIG. 6, the parameter is analyzed to determine whether a digital certificate is invalid or untrusted. Of course, a parameter may be analyzed for any other purpose, such as to assist in determining a demand for certificates from a particular certification authority.

At S615, a determination is made whether the recovered parameter matches a criteria set by the network. In other words, a determination is made at S615 whether the digital certificate currently being analyzed includes information that is sought by the system scanner 175. When the recovered parameter matches a criteria set by the network (S615=Yes), the entry is flagged at S620 and the information is matched with the originating address and port for the information at S625. The flagged address information may be displayed for a user of the system scanner 175. Additionally, the flagged address and information may be separately stored in a memory, e.g., in a temporary file for digital certificates that match the criteria being sought. The flagged addresses and digital certificates are grouped together for presentation to a user and/or storage, until the user processes the information by, e.g., taking action to eliminate or replace invalid, expiring or untrusted digital certificates. As described above, in an embodiment, the user of the system scanner 175 is an administrator responsible for monitoring addresses on the network.

After matching the flagged information with the address information at 625, or if the recovered parameter does not match the criteria set by the network at S615 (S615=No), a determination is made at S630 whether another certificate is associated with the current address. If another certificate is associated with the current address (S630=Yes), the next digital certificate is retrieved at S635 and the process is repeated from S610 to S630. If another certificate is not associated with the current address (S630=No), a determination is made whether another address remains in the group to be analyzed at S640. If another address remains in the group (S640=Yes), the next address is retrieved at S645 and the process repeats from S605 to S640. If no additional addresses remain in the group to be searched (S640=No), the process ends.

Figure 7:
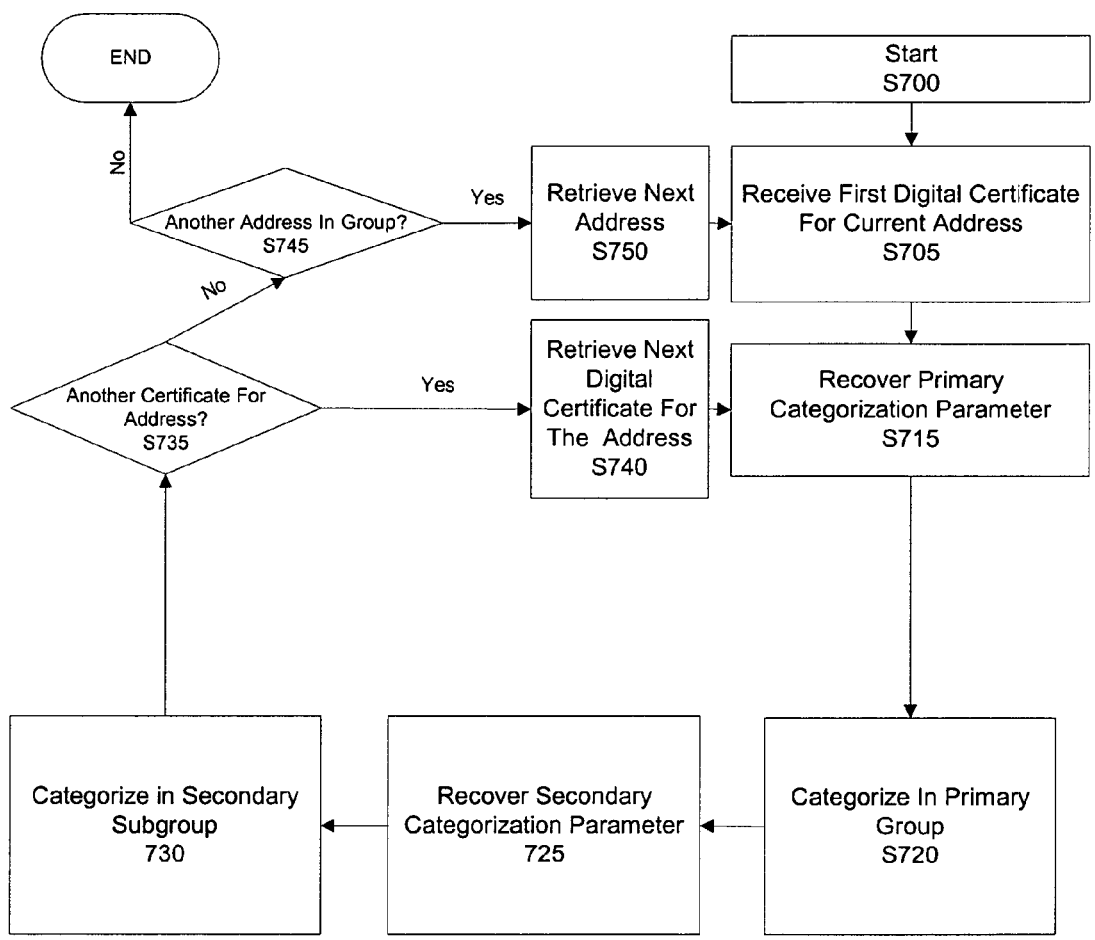
FIG. 7 is an exemplary flow diagram for cataloging digital certificates, according to an aspect of the present invention.

FIG. 7 is a flow diagram for cataloging digital certificates. The process starts at S700, and at S705 a first digital certificate is received for the current address. At S715, a primary categorization parameter is recovered. A primary categorization parameter is the primary piece of information being used to categorize the digital certificates. For example, the digital certificates may be categorized primarily by expiration date. Alternatively, the digital certificates may be categorized primarily by the issuing certification authority.

At S720, the digital certificate information is categorized in a primary group according to the primary categorization parameter. At S725, a secondary categorization parameter is recovered. The secondary categorization parameter is a piece of secondary information used to categorize digital certificates. For example, if a primary categorization parameter is an expiration date, the secondary categorization parameter may be the issuing certification authority.

At S730, the digital certificate information is categorized in a secondary subgroup, i.e., a subgroup of the primary category. At S735, a determination is made whether another digital certificate has been installed for the address. If another certificate has been installed for the address (S735=Yes), the next digital certificate for the address is retrieved at S740 and the process repeats from S715 to S730. If no other digital certificate has been installed for the address (S735=No), a determination is made at S745 whether another address exists for the group of digital certificates being categorized. If another address exists in the group (S745=Yes), the next address for the group is retrieved at S750 and the process from S705 to S745 is repeated. If no other address exists for the group (S745=No), the process ends.

An exemplary use of automated digital certificate discovery and management may include management of an internal network for a corporation. For example, digital certificates can be discovered and managed to ensure that expiring digital certificates are replaced. In this regard, a local area network may be assigned an address range or a collection of individual disparate addresses. The addresses may be scanned by an administrator to discover the information for all digital certificates installed on target computers 101, 102 for the addresses on the network. The administrator uses the information to ensure that operations are not disrupted by the unexpected expiration of digital certificates. Therefore, system availability is assured for automated applications when the administrator takes action to replace expiring digital certificates.

Of course, the automated digital certificate discovery and management can be provided to scan any accessible set of addresses or address range. Accordingly, automated digital certificate discovery and management can be provided as a service by any entity, including a business, governmental or other institution. For example, a service business may discover and manage digital certificates so as to update customers when a user has installed a fraudulent or otherwise untrustworthy digital certificate.

Additionally, the information can be managed, categorized, inventoried and monitored in any manner designated by a user or provider of the system scanner 175. For example, if system scanning is provided as a service, the digital certificate information can be organized in a group for the customer, even if the customer has hundreds or thousands of digital certificates installed for various users. Furthermore, the digital certificate information can be organized in subgroups by, for example, expiration date or the issuing certification authority.

Additionally, the information can be monitored in many additional ways. For example, an entire set of information can be monitored periodically. Alternatively, a subset of information can be monitored according to the perceived risk the information presents in disrupting operations of an organization such as a business or governmental entity. Accordingly, automated digital certificate discovery and management may be used in any environment where the functionality of the system scanner 175 may be used to assure the security of communications as provided by digital certificates.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the system scanner 175 may be entirely embodied as a set of software instructions installed as a prepackaged program for execution on a user's device. Further, the target computers 101, 102 may be computers on the same or different local area network, so long as the target computers 101, 102 can be scanned by the system scanner 175. Further, instead of the certification authority 140 being a third party issuer of digital certificates, the certification authority maybe an employer or service provider to the target computers 101, 102. In this regard, an employer may serve as a certification authority 140 for its employees using the target computers 101, 102. Alternatively, a financial institution may serve as a certification authority 140 for its customers using the target computers 101, 102. Additionally, in the example of FIG. 1, multiple certification authorities 140 may be used to provide digital certificates to target computers 101, 102.

In an embodiment, the system scanner 175 shown in FIG. 1 maybe a portable device so that it can be directly connected to a target computer 101, 102 or another device on a network or local area network. Furthermore, the system scanner 175 may be a device that is directly connected to a certificate repository 150. Additionally, the scanner 175 may be a software module or program that is installed directly on a target computer 101, 102 or another device, either from a portable computer readable medium or over a network such as the internet.

Additionally, the steps shown in the figures may be performed in a different order, or not be performed at all. Additional steps may also be performed by the system scanner 175. For example, in FIG. 4 and FIG. 5, the system scanner may catalog and inventory digital certificate information and analyze the information only after all digital certificates are discovered for a given set of addresses. Additionally, the system scanner may monitor digital certificate information by periodically re-contacting an address to re-obtain the digital certificate information for any digital certificates installed for the address. In this way, the system scanner may compare new digital certificate information and the previous digital certificate information, and determine when a new digital certificate has been installed. Accordingly, any method of discovering, analyzing, cataloging, inventorying or monitoring digital certification information may fall within the purview of the invention.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for digital certificate format (e.g., X.509), transfer protocols (e.g., HTTP, HTTPS), packet switched network transmission (e.g., IP) and interface protocols (e.g., SSL, SQL) represent examples of the state of the art. Such standards are periodically superseded by faster or more efficient equivalents having essentially the same functions. Accordingly, replacement standards and protocols having the same functions are considered equivalents. For example, lightweight directory access protocol (LDAP) may be used instead of secure sockets layer (SSL) to contact and/or search a certificate repository 150 as described herein.

What is claimed is:

1. A scanner that discovers digital certificates by scanning an address range, the scanner scanning the address range to determine whether a digital certificate has been installed for each address in the address range, the scanner receiving digital certificate information when the digital certificate has been installed for any address in the address range, wherein the scanner scans the address range by attempting to forward a query to a device at each address in the address range to determine whether the digital certificate has been installed for the address.

2. The scanner of claim 1, the address range including an address associated with the installed digital certificate and an address not associated with any installed digital certificate.

3. The scanner of claim 1, comprising:
an analyzing module that analyzes the digital certificate information; and
at least one of a cataloging module that catalogs the analyzed digital certificate information, an inventorying module that inventories the analyzed digital certificate information, and a monitoring module that monitors the analyzed digital certificate information.

4. The scanner of claim 1, comprising:
an analyzing module that analyzes the digital certificate information for a plurality of digital certificates installed for a corresponding plurality of ports at a single IP address;
wherein each address of the address range comprises a port number and an IP address.

5. The scanner of claim 1, in which the scanner scans the address range by forwarding a query to a repository to determine whether the digital certificate has been installed for each address in the address range.

6. A method for discovering digital certificates, the method comprising:

scanning an address range to determine whether a digital certificate has been installed for each address in the address range; and receiving information of the digital certificate when the digital certificate has been installed for any address in the address range, wherein the scanning includes attempting to forward a query to a device at each address in the address range to determine whether the digital certificate has been installed for the address.

7. The method of claim 6, the address range including an address associated with the installed digital certificate and an address not associated with any installed digital certificate.

8. The method of claim 6, further comprising:

analyzing the received digital certificate information; and one of cataloging, inventorying and monitoring the analyzed digital certificate information.

9. The method of claim 6, the analyzing including an analysis for a plurality of digital certificates installed for a corresponding plurality of ports at a single IP address;

wherein each address of the address range comprises a port number and an IP address.

10. The scanner of claim 6, in which the scanning includes forwarding a query to a repository to determine whether the digital certificate has been installed for each address in the address range.

11. A computer readable medium storing a program that discovers digital certificates by scanning an address range, the computer readable medium comprising:

an address scanning code segment that scans an address range to determine whether a digital certificate has been installed for each address in the address range; and an information receiving code segment that receives information of the digital certificate when the digital certificate has been installed for any address in the address range, wherein the scanning includes attempting to forward a query to a device at each address in the address range to determine whether the digital certificate has been installed for the address.

12. The computer readable medium of claim 11, the address range including an address associated with the installed digital certificate and an address not associated with any installed digital certificate.

13. The computer readable medium of claim 11, further comprising:

an analyzing code segment that analyzes the received digital certificate information; and one of a cataloging code segment that catalogs analyzed digital certificate information, an inventorying code segment that inventories analyzed digital certificate information and a monitoring code segment that monitors analyzed digital certificate information.

14. The computer readable medium of claim 11, the information receiving code segment analyzing digital certificate information for a plurality of digital certificates installed for a corresponding plurality of ports at a single IP address;

wherein each address of the address range comprises a port number and an IP address.

15. The computer readable medium of claim 11, in which the scanning includes forwarding a query to a repository to determine whether the digital certificate has been installed for each address in the address range.

16. A scanner that manages discovered digital certificates, the scanner receiving digital certificate information when a digital certificate is determined to be available for an address, the scanner analyzing the received digital certificate information and one of cataloging, inventorying and monitoring the analyzed digital certificate information, wherein the monitoring comprises periodically re-forwarding a query to a destination and determining whether the digital certificate is still available for the address.

17. The scanner of claim 16, the cataloging comprising categorizing the digital certificate information into one of a plurality of categories according to a predetermined parameter.

18. The scanner of claim 16, the inventorying comprising obtaining statistics relating to a group of discovered digital certificates.

19. The scanner of claim 16, the monitoring comprising periodically re-analyzing the received digital certificate information.

20. A method for managing discovered digital certificates, the method comprising:

receiving digital certificate information when a digital certificate is determined to be available for an address;

analyzing the received digital certificate information;

one of cataloging, inventorying and monitoring the analyzed digital certificate information, wherein the monitoring comprising periodically re-forwarding a query to the destination and determining whether the digital certificate is still available for the address.

21. The method of claim 20, the cataloging comprising categorizing the digital certificate information into one of a plurality of categories according to a predetermined parameter.

22. The method of claim 20, the inventorying comprising obtaining statistics relating to a group of discovered digital certificates.

23. The method of claim 20, the monitoring comprising periodically re-analyzing the received digital certificate information.

24. A computer readable medium that manages discovered digital certificates, the computer readable medium comprising:

a digital certificate receiving code segment that receives digital certificate information when a digital certificate is determined to be available for an address;

an analyzing code segment that analyzes the received digital certificate information; and one of a cataloging code segment that catalogs analyzed digital certificate information, an inventorying code segment that inventories digital certificate information, and a monitoring code segment that monitors digital certificate information, wherein the monitoring comprising periodically re-forwarding a query to the destination and determining whether the digital certificate is still available for the address.

25. The computer readable medium of claim 24, the cataloging comprising categorizing the digital certificate information into one of a plurality of categories according to a predetermined parameter.

26. The computer readable medium of claim 24, the inventorying comprising obtaining statistics relating to a group of discovered digital certificates.

27. The computer readable medium of claim 24, the monitoring comprising periodically re-analyzing the received digital certificate information.

* * * * *